June 3, 1930.  C. W. WEISS  1,760,927
POWER TRANSMISSION DEVICE
Filed Feb. 16, 1929   2 Sheets-Sheet 1
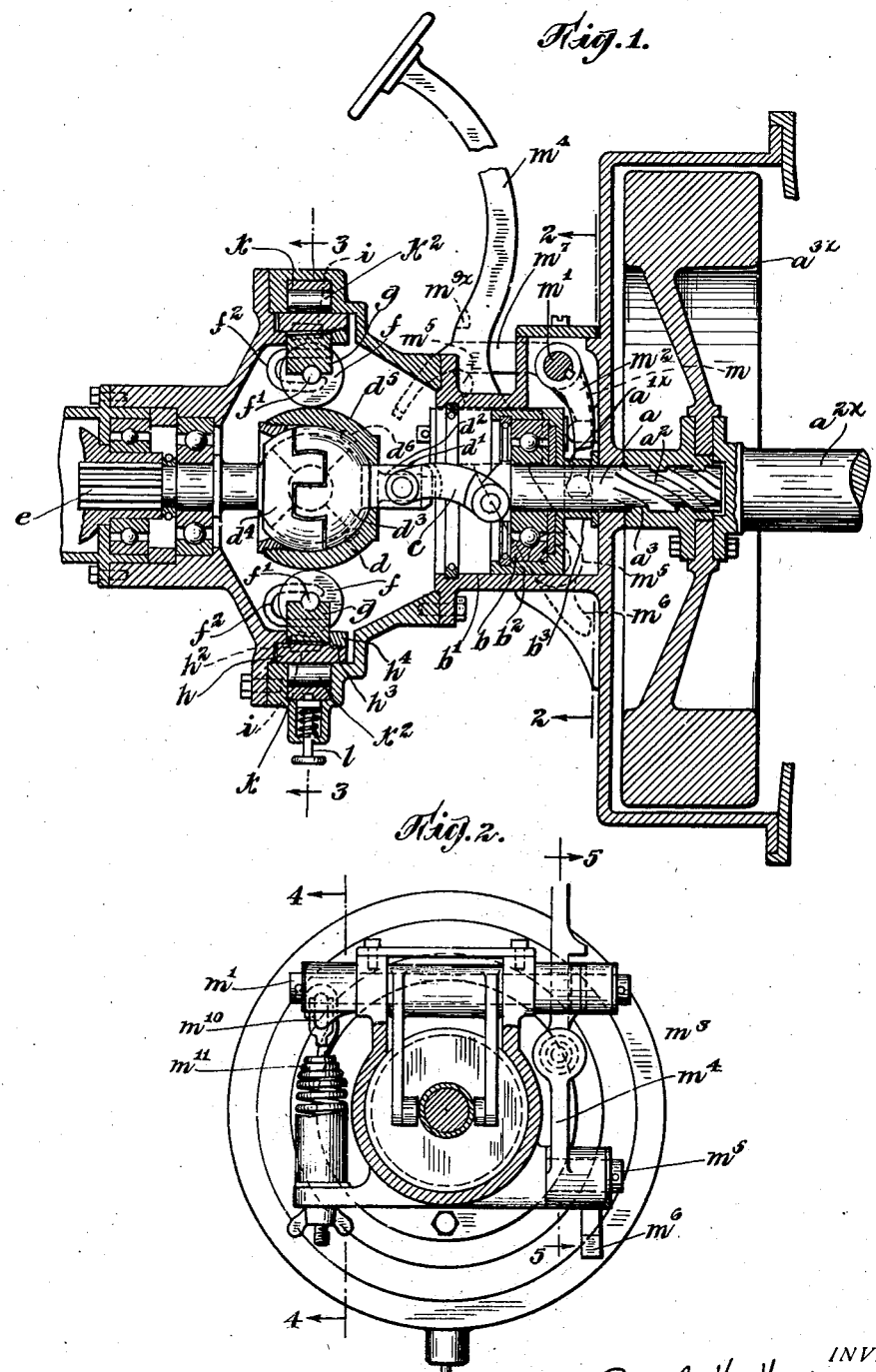
INVENTOR
Carl W. Weiss
BY Redding, Greeley, O'Shea Campbell
ATTORNEYS

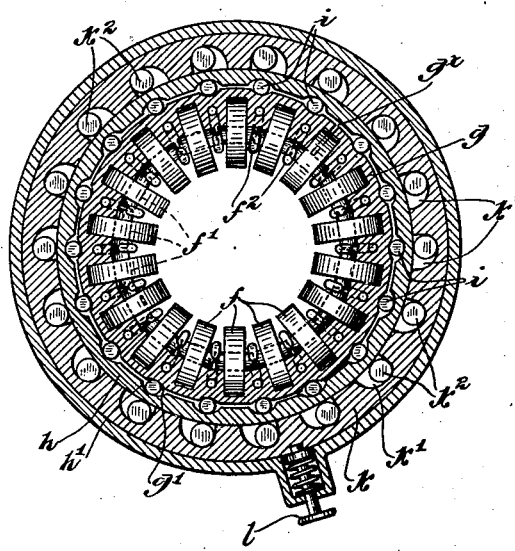
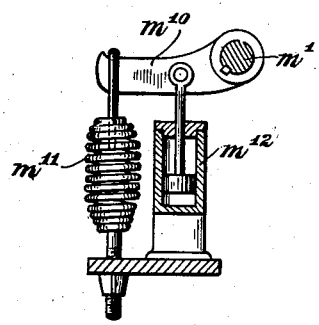
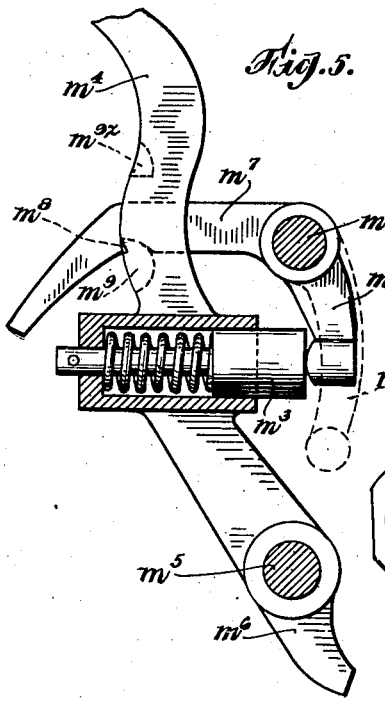
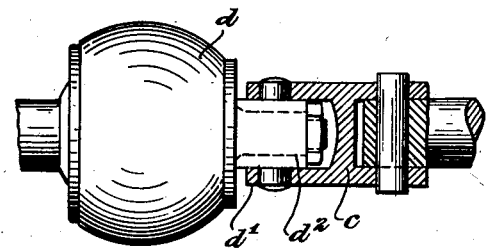
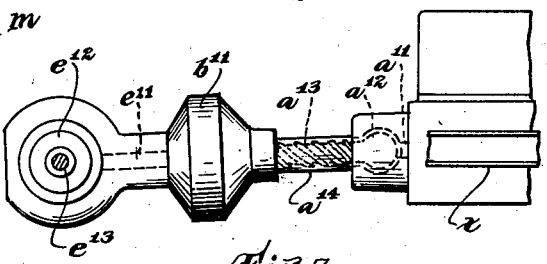

Patented June 3, 1930

1,760,927

UNITED STATES PATENT OFFICE

CARL W. WEISS, OF BROOKLYN, NEW YORK

POWER-TRANSMISSION DEVICE

Application filed February 16, 1929. Serial No. 340,499.

This invention relates to power transmission devices of the general character of that shown in Letters Patent of the United States No. 1,146,982, dated July 20, 1915, in which are comprised a nutating mutor, a cooperating body concentric with the mutor, one of said parts having a spherical bearing surface, and the other of said parts having gripping elements to cooperate with the spherical bearing surface, and means to vary the relative angular axial position of said parts. In the embodiments of the invention illustrated in said Letters Patent and in several other Letters Patent covering modifications and adaptations of the principal invention, the gripping elements are shown as supported by the nutating body or mutor and as coacting with a surrounding concave spherical surface. Since the inertia forces are proportional to the weight and the square of the radius of gyration, such a construction, when driven at high speed, has been found to give rise to objectionable vibration, by reason of the radial distance of the gripping elements from the axis. The primary object of the present invention has been to prevent as far as possible the development of the objectionable vibration by reducing the inertia forces and to that end the gripping elements, in accordance with the present invention, are mounted in fixed bearings on a fixed support or housing and are external to the nutating body or mutor which presents a spherical surface of small radius for coaction with the gripping elements. The consequent absence of vibration at high speeds renders the improved transmission device particularly well suited for automobile use for which use other features of the invention have also been developed. One of such features has had for its object to place the transmission device under the control of the operator so that it will be possible for the operator to place the device in a neutral position without the operation of a clutch. Another purpose has been to enable the car to which it is applied to coast without requiring a quick change from a high speed position of the transmission device to a zero speed position with sudden stopping of the car.

Still another purpose has been to provide such a construction as will permit the car to be moved by man power as is sometimes necessary in a garage, while at the same time the car is prevented from running back if it is stopped while ascending a hill. These and other objects of the invention will be more fully explained hereinafter with reference to the accompanying drawings in which is illustrated a practical and satisfactory embodiment of the invention and in which:

Figure 1 is a view in longitudinal sectional elevation of such an embodiment of the invention.

Figure 2 is a view in section on the plane indicated by the broken line 2—2 of Figure 1, looking in the direction of the arrows.

Figure 3 is a detail view in section on the plane indicated by the broken line 3—3 of Figure 1, looking in the direction of the arrows.

Figure 4 is a detail view in section on the plane indicated by the broken line 4—4 of Figure 2, looking in the direction of the arrows.

Figure 5 is a detail view in section on the plane indicated by the broken line 5—5 of Figure 2, looking in the direction of the arrows.

Figure 6 is a detail view illustrating particularly the connection between the drive shaft and the nutating body or mutor.

Figure 7 is a view in outline illustrating an application of the transmission to an automobile.

In the embodiment of the invention illustrated a drive shaft or member $a$ is shown as supported in a housing $a^{1x}$ and in the end of an engine shaft $a^{2x}$ which has mounted thereon a flywheel $a^{3x}$. For the purposes of torque control, as described in Letters Patent of the United States No. 1,537,515, dated May 12, 1925, the shaft $a$ has a limited longitudinal movement and is operatively engaged with the engine shaft $a^{2x}$ through a helix $a^2$ formed on the shaft $a$ and having a corresponding female member $a^3$ formed in the shaft $a^{2x}$. The shaft $a$ is also supported in a suitable bearing $b$ which is movable longitudinally with the shaft in a sleeve $b^1$ supported with the housing $a^{1x}$. Hinged to the drive shaft $a$ at its extremity is a link $c$, which is similarly engaged at its other end with a sleeve $d^1$ on a stud $d^2$ which projects from a spherical nutating body or mutor $d$. This nutating body or mutor, in the construction shown, comprises the two parts $d^3$ and $d^4$ of an universal joint of the general character of that shown in Letters Patent of the United States No. 1,522,351, January 6, 1925, and, for convenience in manufacture, a separate spherical shell $d^5$ which forms a housing for the two parts of the universal joint and furnishes a spherical surface for coaction with the gripping elements to be described. The shell may be keyed to the member $d^3$ of the universal joint, as indicated at $d^6$. The other member $d^4$ of the universal joint is fixed to or forms a part of the driven shaft $e$.

The gripping elements $f$ are roller supported upon axes $f^1$ so that they may be rotated freely each in a radial plane of the axis of the driving and driven shafts in a ring $g$, split at one point, as at $g^x$, to permit the ring to be collapsed slightly, the shaft $f^1$ of each gripping element being retained by a spring clip $f^2$ in an open bearing formed in the ring $g$. The ring $g$ is received within a ring $h$, the proximate faces of the rings $g$ and $h$ being formed with tapered pockets $g^1$ and $h^1$ to receive in each a tapered roller $i$, so that, by slight relative movement of the rings $g$ and $h$ and the consequent action of the rollers $i$, the ring $g$ will be collapsed slightly and the gripping elements will be pressed firmly into contact with the spherical surface of the mutor. To permit adjustment of the pressure to be made the ring $h$ is formed with a shoulder at $h^2$ to bear against the larger end of the rollers and is threaded, as at $h^3$, to receive an adjusting ring $h^4$ which bears against the side of the ring $g$ so that the rollers can be drawn to the right in Figure 1 to increase the pressure. The ring $h$ is received in turn within a ring $k$ which is formed on its inner face with pockets $k^1$, tapered in one direction, to receive in each a roller $k^2$. This ring $k$, with its pockets $k^1$ and rollers $k^2$, constitutes a reaction ring for the gripping elements, permitting relative rotation of the series in one direction but preventing rotation in the opposite direction. Under certain conditions, as when it may be desired to move an automobile backward by man power in a garage, the reaction device is permitted to rotate and for this reason it may be held normally from rotation by a spring pressed detent $l$, which can be withdrawn when it is desired to permit free rotation of the reaction device.

To permit manual as well as automatic torque control of the transmission, as is necessary in the operation of an automobile, the shaft $a$ is movable longitudinally by hand for the purpose of changing the relative angular position of the mutor $d^3$, $d^4$, $d^5$, and for this purpose the bearing $b$ for the shaft is placed in a supporting member $b^2$ which is movable axially in the sleeve $b^1$ of the housing and has a grooved collar $b^3$ which is engaged by a fork $m$. The latter is fixed on a shaft $m^1$ which is mounted in suitable bearings carried by the housing and has extended therefrom an arm $m^2$ which bears against a spring plunger $m^3$ carried by an operating lever or pedal $m^4$. The latter is pivoted on the housing as at $m^5$, and has below the pivot an extended toe $m^6$ which prevents excessive movement of the pedal.

The shaft $m^1$ also has mounted on it a latch $m^7$, which is notched as at $m^8$, for engagement with a detent $m^9$ on the operating lever or pedal $m^4$, by which the pedal may be restrained from movement toward the left hand in Figures 1 and 5, being released as will be explained hereinafter. The shaft $m^1$ also has secured to it an arm $m^{10}$ which is engaged by a spring $m^{11}$ tending to rock the shaft in a direction to move the lever or pedal $m^4$ when it is released. A dash pot $m^{12}$ is also connected to the arm $m^{10}$ to retard the movement of the lever or pedal $m^4$ when it is released.

For convenience in illustration the transmission is shown in Figure 1 of the drawings as connected directly to the motor shaft through the internally grooved member $a^3$ which may be called a torque tube, since it is by means of this tube and the cooperating helix $a^2$ that the angular displacement of the mutor is effected automatically and the transmission is torque controlled. For some uses the transmission may thus be connected directly to the engine shaft and both the engine and the transmission be mounted upon the same frame, but for pleasure vehicle use it is desirable to prevent the transference of vibrations in the transmission to the chassis and for this reason the manner of mounting the transmission which is illustrated in Figure 7 is preferred. As there shown the shaft $a^{11}$ of the engine, mounted on the chassis indicated at $x$, is connected through a universal joint $a^{12}$, with a shaft $a^{13}$ which is formed with an external helix and engages a torque tube or torque member $a^{14}$ which is formed with an internal helix. The torque tube or member is connected by a link with the mutor of the transmission, as shown in Figure 1, and, as also shown in Figure 1, is provided with a collar $b^3$ for engagement by the controlling fork $m$. The driven shaft $e^{11}$ in this arrangement may be engaged with the usual differential $e^{12}$ of the rear axle $e^{13}$ of the automobile. Since the construction of the transmission itself is in all respects as shown in Figure 1, it is unnecessary to repeat such illustration in Figure 7, the location of the transmission being sufficiently indicated by the housing $b^{11}$.

It will be understood that the function of the mutor, shown in Figure 1, in effecting, in cooperation with the gripping elements, the rotation of the driven shaft $e$, is performed in the manner fully described in said Letters Patent No. 1,146,982. When the parts are in the positions shown in Figure 1 the sleeve $d^1$ rotates upon the stud $d^2$ of the mutor without causing the same to nutate. The ratio of the speed of the driving shaft to the speed of the driven shaft is therefore infinite. As the angle of the axis of the mutor and the axis of the driving shaft increases the ratio of the speed of the driving shaft to the speed of the driven shaft decreases from infinity toward unity with the increase of the angle, but not the same ratio. If the mutor is angularly displaced the nutation of the mutor begins and, if the progressive displacement of the mutor is not prevented, increases the speed of the driven shaft to the limit of the power of the motor, it being understood that with the increase in speed the centrifugal action of the unbalanced link $c$ occasions progressive displacement of the mutor. In the construction shown such displacement, accomplished by the forward movement (to the left in Figure 1) of the shaft $a$, takes place against the action of the spring $m^{11}$, placing the same under increased tension. If resistance is offered to the rotation of the driven shaft, as when the car to which the transmission is applied is traveling on an ascending grade, the engine speed drops and the torque member moves to the right in response to the action of the controlling spring $m^{11}$ and the horsepower transmitted is thereby controlled automatically. It will be obvious that the tendency of the transmission to set up vibrations is greatly reduced when, as in the construction hereinbefore described, the gripping elements are mounted on fixed axes supported by the housing and coact with the central nutating spherical member, as compared with a transmission in which the gripping elements are carried with the nutating member, by reason of the relatively smaller radius of gyration of the nutating member and by the relative reduction in weight carried by the nutating member.

In the foregoing description of the operation of the transmission it has been assumed that the operation is entirely automatic and that no means is provided to restrain the displacement of the mutor under the influence of the speed of rotation of the driving shaft and the opposing resistance of the driven shaft. In the practical application of the transmission to various forms of mechanisms and particularly to automobiles it is necessary, especially if the transmission is to function satisfactorily without the inclusion of a clutch somewhere in the mechanism, to place the transmission under the control of the operator so that the mutor can be brought at once to a zero or neutral position, with its axis in alignment with the axis of the engine shaft or torque member. For this reason there are provided the manual controlling devices which have been described, the operation of which is initiated by the controlling lever or pedal $m^4$. With the parts in the position shown in Figure 1 the mutor is held in its zero position by the engagement of the notch $m^8$ of the link $m^7$ with the detent lug $m^9$ of the controlling lever $m^4$. A quick thrust against the operating lever or pedal $m^4$ causes the latch $m^7$ to fly up to an extent limited by the stop lug $m^{9x}$. If the pressure against the lever $m^4$ is relieved at once the lever will swing forward (to the left in Figure 1), relieving the yielding pressure of the plunger $m^3$ against the arm $m^2$ of the shaft $m^1$. The fork $m$ being thus released the torque member $a$ will move forward (to the left in Figure 1) displacing angularly the mutor to an extent determined by the speed of rotation of the engine shaft, the resistance to the rotation of the driven shaft and the tension of the spring $m^{11}$. At any time it is then in the power of the operator, by applying pressure to the controlling lever $m^4$, to restore the mutor to its zero position or, if desired, to a position near its zero position, either disconnecting the transmission from the engine shaft altogether, or permitting the driven shaft to rotate faster than the engine shaft, as when the car is permitted to coast, while reengagement with the motor can be effected instantly by release of pressure against the operating lever $m^4$. It is only when the transmission is to be disconnected from the motor for the time being that the operating lever is pushed back far enough to be engaged and held by the latch $m^7$. It will be understood that the speed of the motor under the various conditions referred to, is regulated in any suitable manner, as through the operation of the usual accelerator.

It has been assumed in the foregoing explanation that the driven shaft $e$ is to be driven always in one direction. It will be understood, however, that the driven shaft $e$ may act through a reversing mechanism controlled in the usual manner to permit a car, for example, to be moved forward or moved backward as conditions may require. The present invention is not concerned with the reversing mechanism, which therefore need not be illustrated or described.

The reaction device, consisting of the ring $k$ with its cammed notches or pockets $k^1$ and reaction rollers $k^2$, provides the means necessary to prevent backward revolution of the series of gripping elements so that they may coact properly with the central spherical member, while permitting the ring of the gripping elements to move in the opposite direction as the conditions may require. Under some conditions, as when a car is to be moved by man power in a garage and should be free to be moved in either direction, the reaction device should be released so that it may move in either direction. Accordingly it is held for action under normal conditions by the detent $l$, which is withdrawn when necessary to permit the reaction device to move freely in either direction and the car to be moved either forward or back as may be desired.

It will be understood that various changes in details of construction and arrangement can be made to suit different conditions of use for the convenience of the manufacturer and that, except as pointed out in the accompanying claims, the invention is not restricted to the particular construction shown and described herein.

I claim as my invention:

1. A power transmission device comprising a central spherical body, means to support the same with freedom for nutation, a series of gripping elements for coaction with the spherical body, a means to support the same in relatively fixed positions about the spherical body, and driving means in operative relation with the spherical body and a driven part also in operative relation with the spherical body.

2. A power transmission device comprising a central spherical body, a universal joint upon which such body is supported with freedom for nutation, a series of gripping elements for coaction with the spherical body, means to support the same in relatively fixed positions about the spherical body, and driving means in operative relation with the spherical body and a driven part also in operative relation with the spherical body.

3. A power transmission device comprising a central spherical body, means to support the same with freedom for nutation, a series of gripping elements for coaction with the spherical body, means to support the same in relatively fixed positions about the spherical body, means to cause the central spherical body to nutate, and a driven part in operative relation with the central spherical body.

4. A power transmission device comprising a central spherical body, a universal joint upon which the central spherical body is supported with freedom for nutation, a driven shaft in operative relation with one member of the universal joint, a series of gripping elements for coaction with the spherical body, means to support the same in relatively fixed positions about the spherical body, and means to cause the central spherical body to nutate.

5. A power transmission device comprising a central spherical body, means to support the same with freedom for nutation, a series of gripping elements for coaction with the spherical body, means to support the same in relatively fixed positions about the spherical body, said means including a reaction device, and driving means in operative relation with the spherical body and a driven part also in operative relation with the spherical body.

6. A power transmission device comprising a central spherical body, means to support the same with freedom for nutation, a series of gripping elements for coaction with the spherical body, means to support the same in relatively fixed positions about the spherical body, said means including a rotatable reaction device, means to prevent rotation of the reaction device, and driving means in operative relation with the spherical body and a driven part also in operative relation with the spherical body.

This specification signed this 5th day of February, A. D. 1929.

CARL W. WEISS.